April 7, 1931. J. R. NOLAN 1,799,698
MACHINE FOR APPLYING REENFORCING WIRE TO CLOTHESPINS
Filed May 4, 1929 7 Sheets-Sheet 2

Inventor
John R. Nolan

April 7, 1931.  J. R. NOLAN  1,799,698
MACHINE FOR APPLYING REENFORCING WIRE TO CLOTHESPINS
Filed May 4, 1929   7 Sheets-Sheet 5

Inventor
John R. Nolan

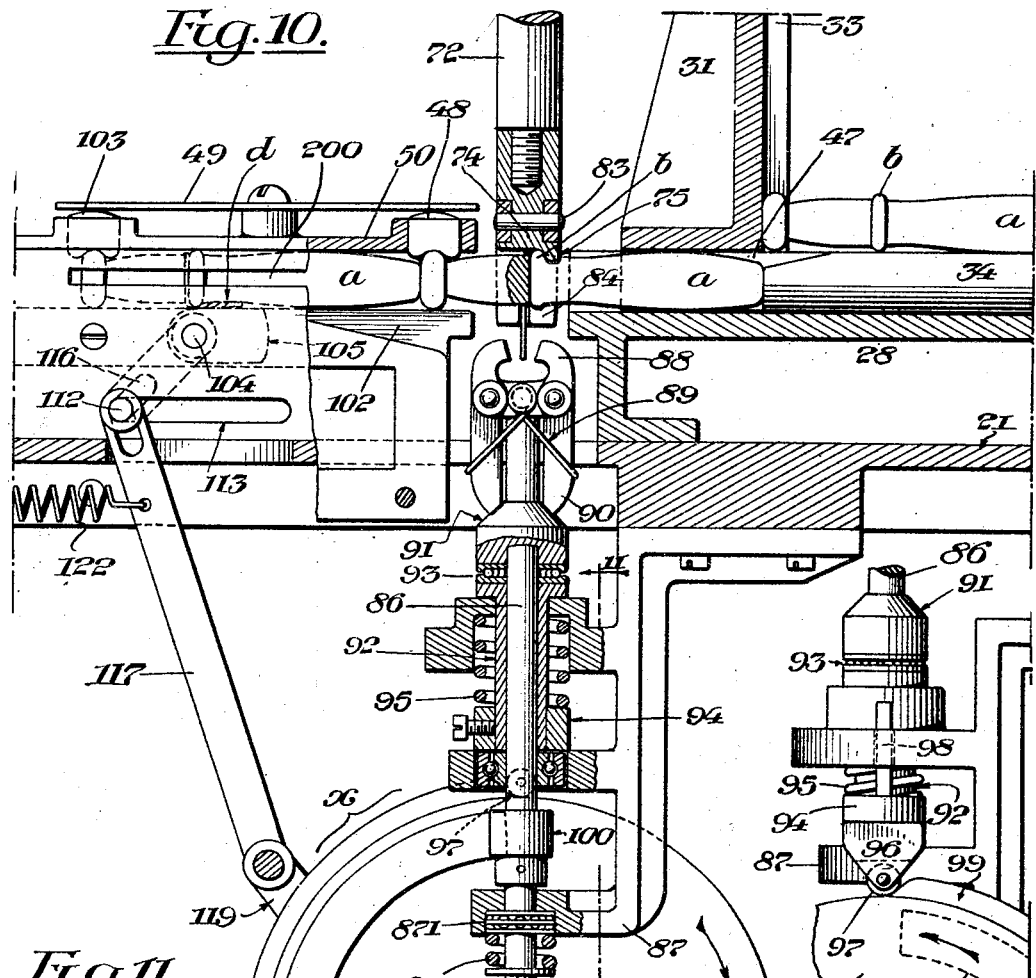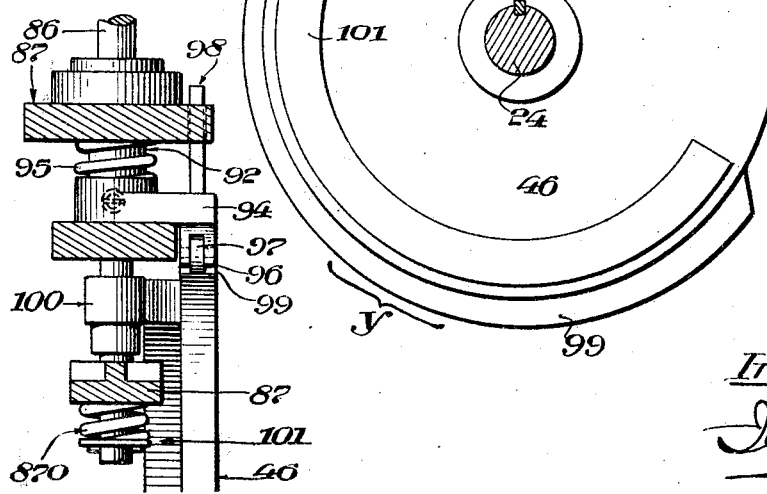

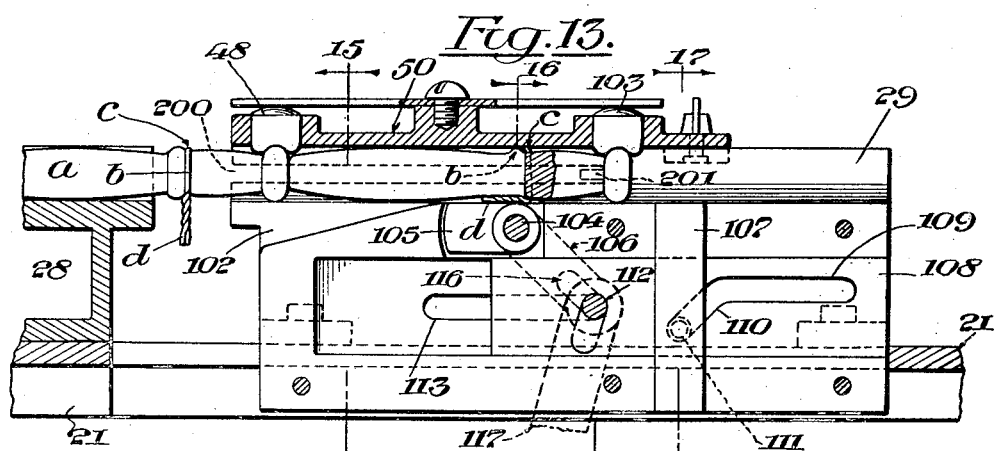

Patented Apr. 7, 1931

1,799,698

UNITED STATES PATENT OFFICE

JOHN R. NOLAN, OF NEW YORK, N. Y.

MACHINE FOR APPLYING REENFORCING WIRE TO CLOTHESPINS

Application filed May 4, 1929. Serial No. 360,380.

This invention relates to a machine for applying reenforcing wire to wooden forked clothespins, and especially a form of reenforcing wire which encircles the clothespin adjacent the junction of the legs and has extended end portions which are tightly twisted together and bent into the space between the legs.

The principal object of the present invention is to provide a machine whereby reenforcing wire is efficiently adapted and applied to clothespins in rapid succession; and to this end, the invention, generally stated, comprises a suitable supporting element for clothespins; means for feeding and positioning clothespins therein; means for positioning a predetermined length of wire in close relation to the path of each succeeding clothespin borne by the support; means for bending the wire about the clothespin; means for twisting together the extended ends of the wire, and means for bending and clinching such twisted ends in the space between the legs of the clothespin.

The invention also comprises novel features of construction and combinations of parts which will be hereinafter described; the scope of the invention then being defined in the appended claims.

In the drawings—

Fig. 10 is a partial longitudinal section, as on the line 10—10 of Fig. 2, showing the clothespin centering and wire clamping members in active positions, and showing also the gripper and actuating mechanism therefor.

Fig. 11 is a sectional elevation as on the line 11—11 of Fig. 10.

Fig. 12 is a fragmentary view showing the elements for vertically actuating a cone head which controls the opening and closing of the gripper jaws.

Fig. 13 is a sectional elevation, illustrating the cooperating elements, including a blade and anvil, for bending and clinching the twisted ends of the wire to and between the legs of the clothespin, said blade and anvil being shown in normal or down condition and a wired clothespin being in position to be engaged thereby.

Fig. 14 is a similar view showing the blade and anvil in their raised position upon completion of the clinching operation.

Figure 1:
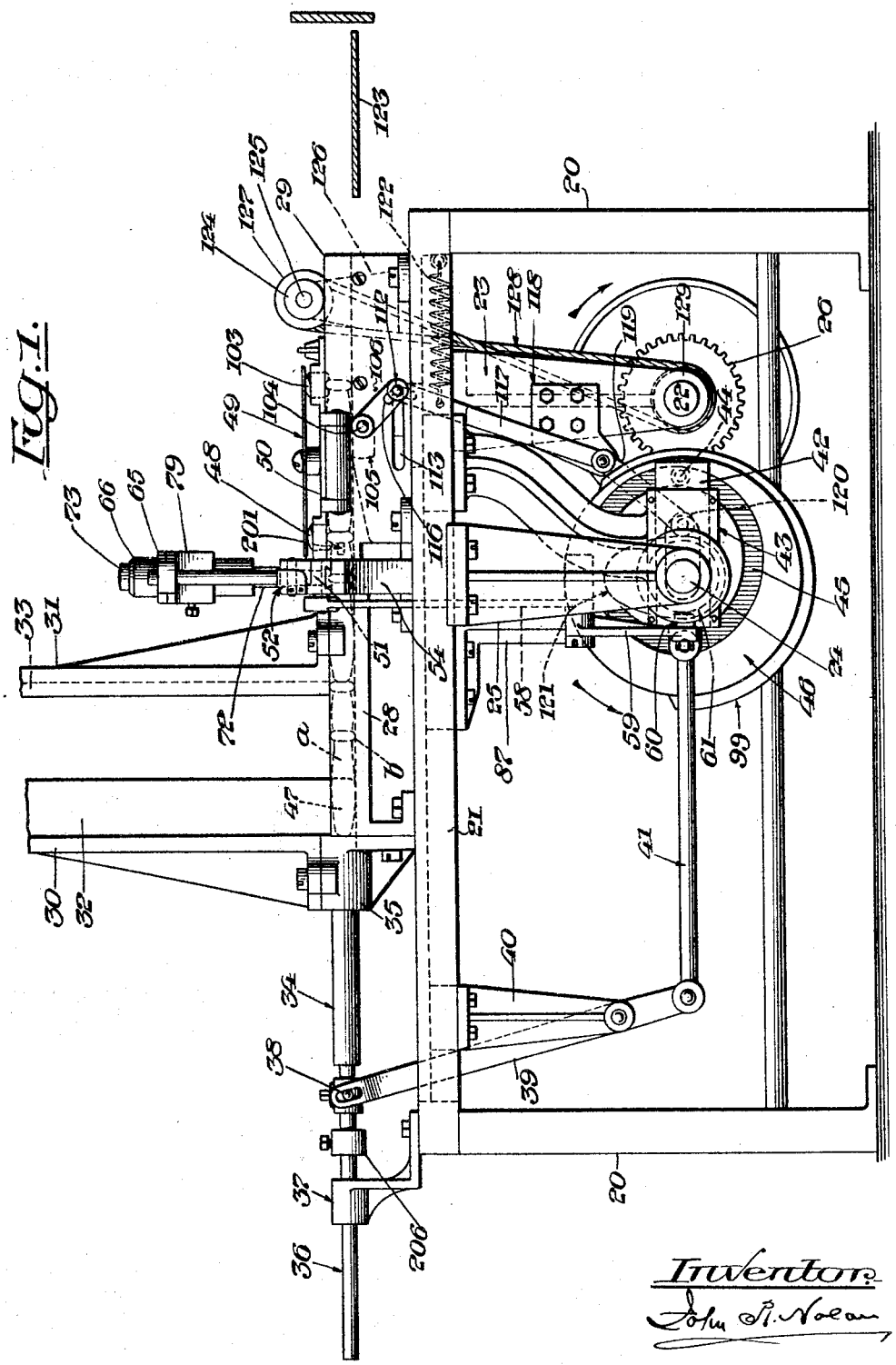
Figure 1 is a side elevation of a machine embodying the principle of my invention for applying reenforcing wire to wooden clothes pins.
Figure 2:
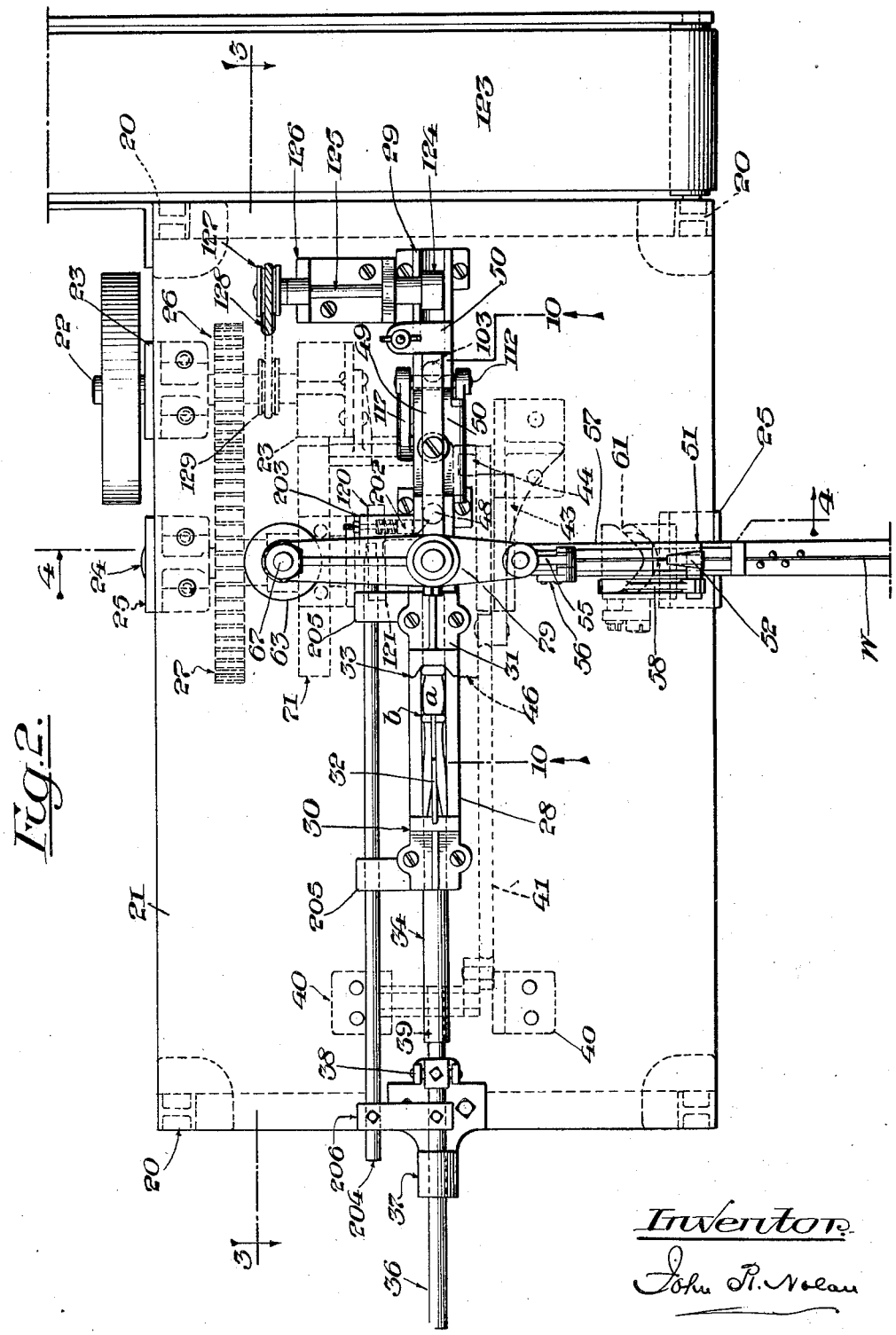
Fig. 2 is a plan of the machine.

Figs. 15, 16 and 17 are transverse vertical sections, as on the lines 15—15, 16—16 and 17—17, respectively, of Fig. 13.

Fig. 18 is a transverse section of a reenforced clothespin at the crotch thereof.

The clothespin ($a$) illustrated in the drawings consists of a wooden body having integral legs spaced apart as usual to afford a pair of yielding gripper members, which members are preferably provided adjacent the crotch with a peripheral bead (b). Encircling the clothespin, in close relation to the bead, is a ring (c) of reenforcing wire, having extended end portions (d) which are tightly twisted together and bent hard into the space between the legs so as to abut against the crotch of the latter.

20 designates a supporting frame, including a bed 21; 22 designates a drive shaft having its bearings in hangers 23 depending from the bed, and 24 designates a shaft parallel with the drive shaft and journaled in bearings in hangers 25 also depending from the bed. The shafts 22, 24 are equipped with co-acting gears 26, 27, respectively.

28, 29 designate two elongated grooved or channeled members supported on the bed in longitudinal alignment, but slightly spaced endwise from each other, which members constitute, in effect, a trough-like support adapted to receive and guide succeeding clothespins end to end, each clothespin temporarily bridging the gap between the two members.

In the present instance, a skeleton hopper comprising parallel up-standing bars 30, 31 is arranged to overlie the receiving end of the first trough member 28, which bars are spaced apart a distance substantially equal to the length of a clothespin. The outer bar 30 is provided on its inner side, throughout its length, with a blade 32 which is proportioned and adapted to be freely embraced by the legs of a horizontally-disposed clothespin (a), and the other bar 31 is longitudinally grooved, as at 33, to receive the head of the clothespin. By this construction clothespins can be superimposed one upon another between the hopper bars with the leg spaces of the successive clothespins in vertical alignment and with the lowermost clothespin resting in the groove of the trough member 28 in proper position to be pushed head foremost to and across the gap between the two sections. Other suitable means for feeding or supplying the clothespins individually to the trough member 28 may be employed.

Each succeeding lowermost clothespin delivered to the trough member 28 is advanced therealong by means of a plunger 34 which is reciprocable in and longitudinally of the channel of said member directly beneath the hopper or other source of clothespin supply. The outer end of the plunger is guided in a bracket 35 on the adjacent end of the trough member 28, and is provided with an extension 36 slidable in a bracket 37 on the bed. This extension is jointed, as by a pin and slot connection 38, to the upper arm 39 of a lever which is fulcrumed on brackets 40 depending from the bed. The lower arm of the lever is jointed to one end of a rod 41 whereof the opposite end is jointed to a horizontally reciprocable head 42 mounted in a suitably-disposed guide 43 on a hanger depending from the bed 21. This head has thereon adjacent its rear end a laterally-extending stud or roll 44 which runs in the cam race 45 of a wheel 46 fast on the driven shaft 24; the contour of the cam race being such that in each rotation of the shaft 24 the head 42 and plunger 34 are reciprocated, there being a dwell at the limit of each stroke. (See Fig. 1). The stroke of the plunger is equal to or greater than the length of a clothespin.

When the plunger is at one end of its stroke it underlies the hopper and supports the lowermost clothespin, and in the succeeding stroke the plunger, being withdrawn from the clothespin, permits such clothespin to drop into and longitudinally of the underlying trough member. In the next succeeding active stroke of the plunger, it pushes the opposing clothespin along the trough member 28 and positions it across the gap between the two members. In this way the clothespins contained in the hopper are successively delivered to the trough by gravity and are advanced therealong by the plunger.

The acting end of the plunger is preferably provided with a longitudinally extending blade 47, which, when the plunger is retracted, lies directly below and in alignment with the vertical blade 32 of the hopper. Therefore, as each succeeding clothespin enters the trough member 28, the legs of the clothespin embrace the plunger blade 47, which blade perforce ensures the proper position of the legs of the clothespin within the trough until the clothespin has been advanced across the gap between the two sections. When each clothespin is positioned across the gap, the clothespin is held temporarily in place by means of a suitably-disposed resilient block 48, the under face of which is appropriately grooved or notched to engage and hold the contiguous head of the clothespin. This block is yieldably supported by one limb of a spring 49 which is affixed to a support on a hinged cover plate 50 of the trough member 29, the block being vertically movable in a suitably-located guide opening in the cover plate. (See Fig. 10).

Figure 4:
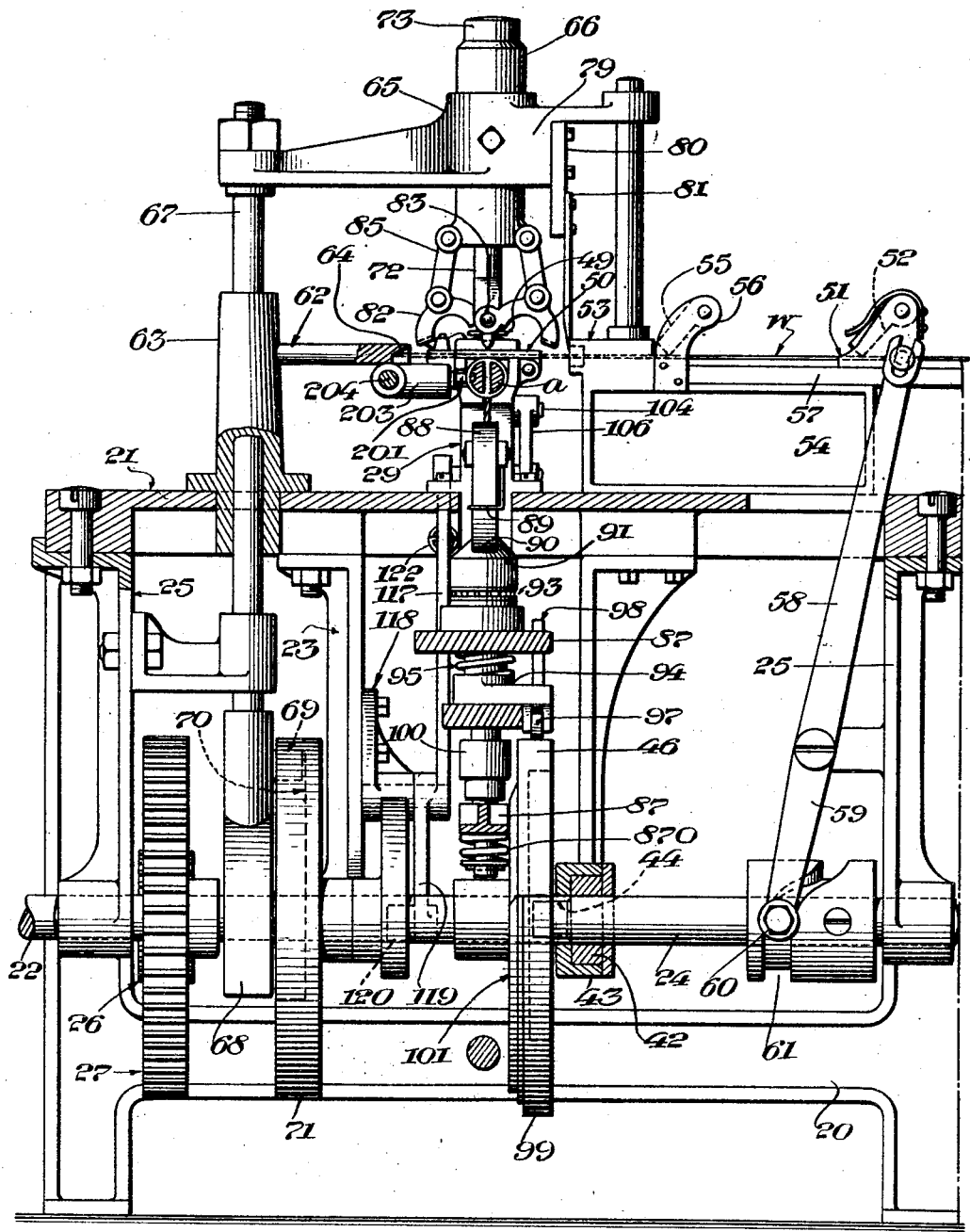
Fig. 4 is a transverse vertical section of the machine, as on the line 4—4 of Fig. 2.

During the advancement of each succeeding clothespin along the trough, a suitable length of reenforcing wire is projected above the gap and the path of the clothespin, which wire length thus transversely overlies the clothespin adjacent the crotch thereof, when the clothespin is positioned across the gap. In the present instance the wire (W) is drawn from a suitably located roll or spool (not shown) by means of a reciprocating feeder comprising a horizontal slide 51 having a pivoted feed dog 52 which, on the inward or feeding stroke of the slide, engages the wire and advances a proper length thereof through a horizontally perforated guide member 53 formed on or secured to a supporting block 54 on the bed 21. (See Fig. 4).

A back stop dog 55 which is pivoted on a bracket 56 supported by the block 54 normally rests upon the wire and prevents its retrograde movement when the slide is retracted.

The slide 51, which is mounted on a bar 57 supported by the block 54, is jointed to the upper arm 58 of a lever which is fulcrumed on the adjacent hanger 25, the lower arm 59 being equipped with a stud or roll 60 engaging the race 61 of a barrel cam fast on the shaft 24. (See Fig. 4). The contour of the cam race is such that during the feeding stroke of the plunger 34, the lever is oscillated in a manner to reciprocate the slide 51 (which thus feeds a proper length of wire and returns in readiness for a succeeding operation) and that during the return stroke of the plunger the lever is quiescent. A horizontally disposed bar 62 which is conveniently supported at a suitable level by a tubular standard 63 hereinafter referred to, and projects toward the path of the clothespin, is provided at its inner end with a conical recess 64 adapted to receive and guide the free extremity of the wire as it approaches its limit of feed, thus ensuring the accurate positioning of the wire length in relation to the clothespin. The bottom of the recess is slotted to permit the downward flexing of the extremity of the wire when the wire length is cut from the body of the wire and is being applied to the clothespin by suitable mechanism, as will presently appear.

Figure 3:
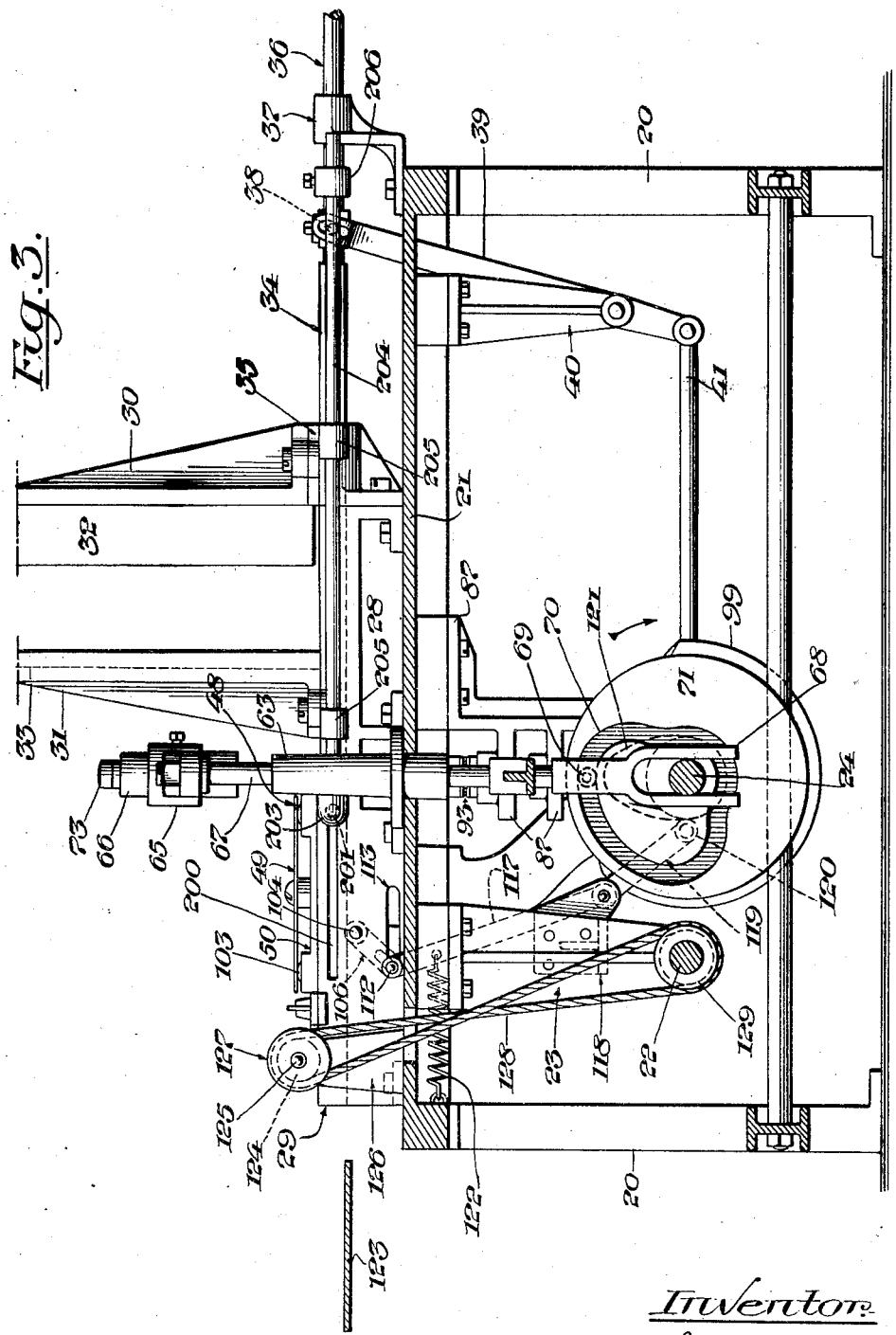
Fig. 3 is a longitudinal vertical section of the same, as on the line 3—3 of Fig. 2.

Immediately preceding the steps of cutting the wire and applying the severed length to the clothespin the central position of the clothespin on its support is insured, and the overhanging length of wire is clamped midway between its ends against the body of the clothespin, as follows: 65 designates a crosshead which overhangs the path of the clothespin and carries a cylindrical housing 66, the vertical axis whereof is directly above the path of the wire and centrally of the underlying clothespin. The cross-head is fixed to a vertically-movable plunger comprising, in the present instance, a rod 67 which is guided in the tubular standard 63 on the bed, and is formed on or affixed to a depending bifurcated foot portion 68 which clears the shaft 24. The foot 68 is equipped with a lateral roll 69 which projects into the race 70 of a face-cam 71 fast on the shaft 24, the contour of the race being such as to effect the timely actuation of the bar and its appurtenances. (See Figs. 3 and 4).

Figure 6:
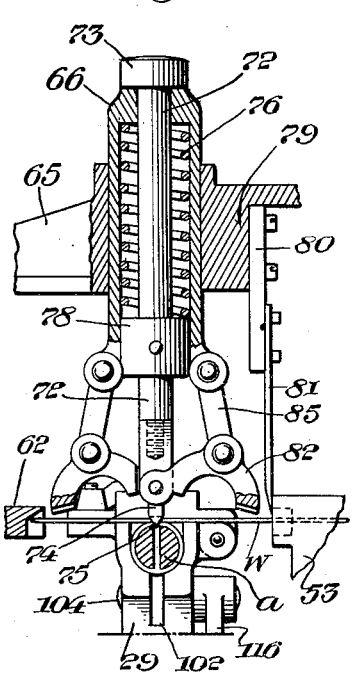
Fig. 6 is a similar view showing the said element partly lowered with its clothespin centering and wire clamping members in action.

Guided in the housing 66 for independent vertical movement is a rod 72 which extends above and below the housing. This rod has a head 73, and also a foot portion 74 with a depending V-shaped centering heel 75, the cooperative relation of the parts being such that when the rod 72 is in down position, the heel 75 enters between and bears against the sides of the legs of the underlying clothespin, adjacent the crotch, as clearly seen in Figs. 6, 7 and 10, thus accurately centralizing the clothespin, while the foot 74 bears upon the opposing wire and clamps it hard against the body of the clothespin. Encircling the rod, within the housing, is a spring 76, which bearing at its respective ends against a shoulder 77 in the housing and against a collar 78 on the rod, tends normally to maintain the rod yieldingly in raised position relative to the housing.

When the housing is at the limit of its upward movement, by virtue of the form of the cam race 70, the top of the housing bears against the head 73 and maintains the rod with its presser foot 74 and centralizing heel 75 sufficiently above the path of the leading end of the wire, W, to permit the advancement of the latter by the feed dog 52. (See Fig. 5). In the initial downward movement of the housing the spring supported rod 72 is moved therewith until the heel 75 and foot 74 respectively engage the clothespin and the wire, as previously explained, whereupon the housing continues its descent against the action of the spring 76.

Figure 5:
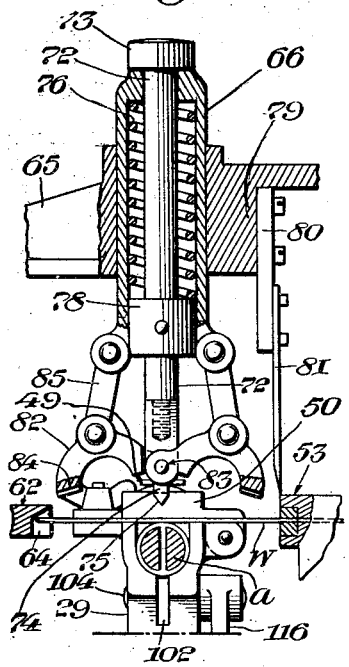
Fig. 5 is a vertical section, partly in elevation, of a reciprocating element including co-operating clothespin centering, wire clamping, wire cutting and wire bending members, showing the various parts in their relative positions when the element is raised, and showing also the leading portion of a wire strand as overhanging a clothespin seated in a support.
Figure 7:
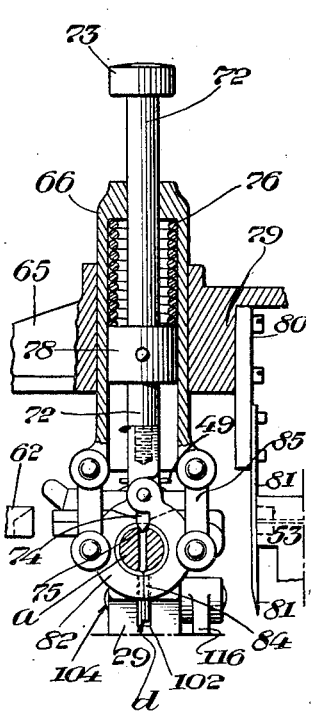
Fig. 7 is a similar view, showing the element in its lowermost position and the leading portion of the wire as severed by the cutter and as bent around the opposing clothespin by the wire bending members preparatory to the engagement of the depending ends of the wire by a twisting gripper.
Figure 8:
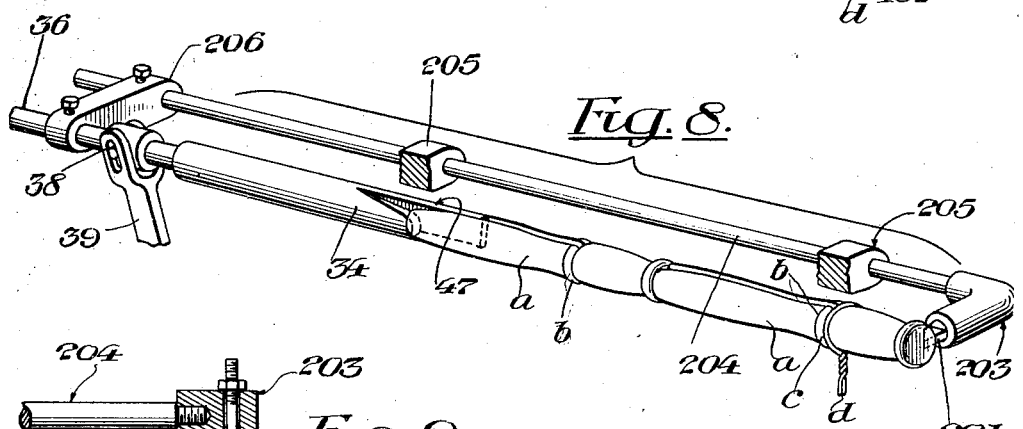
Fig. 8 is a perspective view of main and supplemental feed devices for independently advancing succeeding clothespins longitudinally of the support, said devices being illustrated in operative relation to the respective clothespins.
Figure 9:
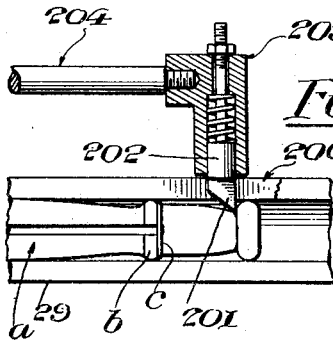
Fig. 9 is a section of the acting head of the supplemental feeder, showing its relation to a clothespin located in the support.

Adjustably fixed to a lateral projection 79 on the housing is a bar 80 having a depending cutter blade 81 which intersects the path of the wire immediately after the presser foot 74 has impinged against the wire, which blade is properly spaced from the free extremity of the wire to sever the required length from the latter. Immediately thereafter the severed length of wire, held midway between its ends by the presser foot 74, is bent about the body of the clothespin by means of a pair of oppositely related substantially semi-circular jaws 82. (See Fig. 7). These jaws are pivoted, as at 83, to the lower portion of the rod 72, and are so disposed as to be movable down to and up from embracing relation to the body of the adjacent clothespin, through arcs intersecting the plane of the wire crossing the clothespin. When the jaws are in the upper position their outer end faces 84 lie slightly above the horizontal path of the wire, (as seen in Fig. 5) so that when the jaws are simultaneously swung downward (as seen in Fig. 7) such faces bear upon the severed wire length and cause it to encircle the clothespin, with the free end portions of the wire length depending between and below the contiguous faces 84 of the jaws. These faces are channeled, as indicated, so as not to grip the pendant ends of the wire.

The respective jaws 82 are pivotally connected by means of links 85 to the lower end of the housing 66, and hence during the vertical reciprocation of the latter through the medium of the cam race 70, the jaws are positively and uniformly swung downward and upward, that is to say, in the descent of the housing, immediately after the wire length has been severed by the cutter, the jaws are forced downward against the opposing wire, and in the succeeding ascent of the housing the jaws are swung upward to clear the path of the next succeeding length of wire advanced by the feed dog. As the housing approaches the limit of its upward stroke, it impinges against the head 73 of the rod 72, thereby bodily lifting the rod sufficiently to raise the foot 74 and the heel 75 above the path of the succeeding wire length. (Fig. 5).

In the bed 21, directly below the gap between the trough members, is an opening in which is located, immediately beneath the path of the bending jaws 82, a rotatable gripper which is arranged and adapted to seize the free extremities of the depending ends of the reenforcing wire and twist such ends tightly together throughout their length in a manner to bind the encircling portion of the wire firmly against the body of the pin. The gripper preferably comprises pincers supported at the upper end of a vertical spindle 86 mounted in a suitably-disposed bracket 87 depending from the bed. The spindle has capacity for limited vertical movement in its bearings in the bracket, and is yieldably held in down position by means, for example, of a stout spring 870 which is interposed between a stop at the foot of the spindle and a thrust bearing 871 in the adjacent bracket member. (See Fig. 10).

The jaws 88 of the pincers are maintained normally open by means of a suitable spring 89, acting against the depending legs 90 of the pincers, which legs embrace the tapering upper portion of a cone head 91 which is loosely fitted on the spindle. Hence when the head 91 is forcibly raised the opposing legs 90 are spread in a manner to close the jaws against the action of the spring 89, and when the head is again lowered the spring returns the jaws to their normal or open condition.

In the present instance the cone head is seated upon a sleeve 92 slidable on the spindle, a thrust bearing 93 being preferably interposed between the head and sleeve. The sleeve is secured to a vertically-movable foot 94 and is held yieldingly depressed by the action of a suitably-disposed spring 95 confined in a socket in the bracket 87. The foot terminates in a toe 96 having an anti-friction roll 97 which rests upon the periphery of the cam wheel 46, said foot having a suitable guide pin or pins 98 slidably fitted in the bracket. The cam wheel 46 is provided with a peripheral segmental cam 99 which at a predetermined interval in its rotation abuts against and raises the roll 97 of the foot 94 and therewith the sleeve 92 in opposition to the action of the spring 95, thereby correspondingly raising the cone 91 and effecting the closing of the jaws of the pincers as previously mentioned. The acting surface of the segmental cam 99 is formed at its leading end with a relatively short concentric portion $x$ which merges with a gradually inclined portion $y$ extending to the trailing end of the cam. The concentric portion maintains the foot for a brief period in raised position, with the pincers closed, and then the inclined portion gradually raises the foot, together with the cone, the closed pincers and the spindle, against the combined action of the springs 95, 870, until the cam escapes the roll 97 of the foot, whereupon the foot descends and the roll bears upon the periphery of the wheel 46; the cone, pincers and spindle thus resuming their down position, with the pincers open, and remaining therein until the roll 97 is again acted upon by the segmental cam 99. (See Figs. 10, 11 and 12).

The spindle 86 depends adjacent the plane face of the cam wheel 46 and is provided with a relatively small friction wheel 100 with which a friction segment 101 on the face of the wheel 46 contacts during an extended interval in each rotation of the latter, thereby imparting a succession of rapid rotations to the friction wheel 100 and the spindle, and correspondingly rotating the pincers. The cam race 70, the segmental cam 99 and the friction face segment 101 are in such timed relation that immediately upon the closing of the bending jaws 82 through the action of the cam 70 the foot 94 is raised by the force of the segmental cam 99 so as to effect the closing of the pincers and the effective gripping of the depending ends of the wire, and coincidentally, through the action of the face segment 101 on the small friction wheel 100, the pincers are rapidly rotated to twist tightly together such ends of the wire.

The cam 99 maintains the jaws of the pincers in wire gripping relation during the twisting operation, whereupon the lifting and closing pressure is removed and the jaws are permitted to resume their normally open and down condition, thus releasing the twisted wire. The gradual upward movement of the closed pincers by the action of the inclined portion of the cam 99 on the roll of the foot 94 compensates for the shortening of the depending ends of the reenforcing wire during the twisting thereof, thus ensuring a tight twisting of the wire and a close binding thereof about the circumference of the clothespin. When the rotation of the pincers is halted the feeding plunger 34 is moved forward, thus pushing another clothespin to the wire applying station. At the same time the wired clothespin is forcibly advanced against the resilient action of the block 48 and along the trough member 29.

In some cases, depending upon the relative dimensions of the heads and the flare of the legs of the clothespins, the advancement of the wired clothespin can be effected by the force of the succeeding clothespin. In order, however, to obviate any liability of the free ends of the legs of the wired clothespin being spread apart, and thus being clamped against the walls of the trough, by the partial entry between such legs of the opposing head of the clothespin that is being forcibly pushed from below the hopper, there are preferably provided means movable concurrently with the plunger 34 and operative to engage the leading clothespin and positively advance it independently of the succeeding clothespin, as follows:

One of the side walls of the trough member 29 is provided with a longitudinal slot or recess 200 through which projects into the path of the head of the contained clothespin a dog 201 formed on one end of a spring-pressed plunger 202 which is slidably mounted in a head 203 on one end of a rod 204. This rod is slidably supported in suitably-disposed brackets 205 so as to lie laterally of and parallel with the trough, the end of the rod remote from the dog being fixed to a laterally extending yoke 206 secured to the extension 36 of the plunger 34. Hence the plunger and rod are reciprocable as a unit. The dog 201 is so spaced from the acting end of the plunger 34 that when the rod 204 is retracted with the plunger 34 the dog engages the opposing shoulder of the head of the clothespin that is positioned at and temporarily held by the resilient block 48, and in consequence in each active stroke of the plunger 34 the dog positively pushes the preceding clothespin along the trough member 29 a distance equal to the length of the clothespin. (See Figs. 2, 3, 8 and 9.)

As each clothespin with its twisted reenforcing wire is pushed ahead, the depending twisted portion of the wire is forcibly bent and clinched at the crotch of the clothespin. The preferred means for this purpose is as follows:

The floor of the trough member 29 is formed at its receiving end, in the path of the depending twisted portion of the wire when the clothespin is advanced, with a longitudinally extending narrow channel 102 the bottom of which inclines gradually upward from the entry end of the member to and merges with the floor of the trough. Hence as the clothespin progresses the pendant twisted portion of the wire impinges against the inclined bottom of the channel and is thereby gradually bent upward to a substantially horizontal position longitudinally of and under the space between the legs of the clothespin. (See Fig. 13.) At the end of its movement the head of the clothespin is engaged and temporarily held by means of an under-grooved block 103, which, like the block 48, is guided in the hinged cover 50 of the trough member 29 and is resiliently supported by the other limb of the spring 49.

Pivoted, as at 104, in the trough member 29 below the floor thereof, in a plane slightly rearward of the crotch of the clothespin when the clothespin is engaged by the block 103, is a clinching member comprising a blade 105 which is movable through a vertical arc into and from the space between the legs of the adjacent clothespin during the return stroke of the plunger 34. When this blade is in down or horizontal position its upper surface is flush, or substantially so, with the floor of the member 29, at the rear of the inclined channel 102, and, therefore, the twisted portion of the reenforcing wire rides upon the opposing surface of the blade. Consequently when the blade is swung upward it forcibly bends the opposing twisted portion of the wire upward and between the legs of the clothespin, as seen in Fig. 14. In the present instance one end of the pivot pin 104 projects through the adjacent side of the trough member 29 and has fast thereon a crank arm 106 by the oscillation of which the blade is periodically raised and lowered, as will presently appear.

Mounted in the trough member 29, rearward of the clinching blade and slightly spaced from the head of the clothespin when the latter is initially positioned in the active plane of the blade 105, is an abutment comprising an anvil block 107 which is movable above and below the floor of such section correspondingly with the blade. A cam bar 108 is mounted in the section 29 for longitudinal sliding movement therein below the blade, which bar has formed therein a longitudinal slot 109 terminating in an inclined cam portion 110. The abutment 107 is bifurcated and its legs, which straddle the bar 108, are connected by a cross pin or roll 111 which extends through the slot of the bar. Hence if the bar be slid in one direction the abutment will be raised above the floor of the trough member 29 by the action on the roll of the inclined cam portion of the slot, the horizontal portion of the slot thereupon receiving the roll and maintaining the abutment in raised position, as seen in Fig. 14, until the bar shall approach the limit of its reverse stroke, whereupon the abutment will be lowered by the action of the inclined portion of the slot on the roll 111, as seen in Fig. 13.

The oscillatory blade 105 and the cam bar 108 may be operated in timed relation to the reciprocation of the feeding plunger 34 by any suitable means. In the present instance, the bar is provided with a transverse pin 112 which extends through longitudinal slots 113 in the respective sides of the trough member 29. One end of the pin extends freely through a longitudinal slot 116 in the crank arm 106, and the opposite end of the pin is jointed to the upstanding arm 117 of a lever which is fulcrumed on a suitably-disposed bracket 118 on the inner hanger 23 or other fixture. The arm 119 of the lever declines toward the shaft 24 and carries a roll 120 which is held in operative contact with a suitable cam 121 fast on the shaft 24, by means of a spring 122 secured to the arm 117 and to the underside of the bed 21. (See Figs. 1, 3, 4 and 10).

The cam 121 is of such contour that during the feeding stroke of the plunger 34 the cam bar 108 is timely reciprocated. In such reciprocation of the cam bar the crank-arm 106 is actuated to raise and lower the clinching blade 105, and, coincidentally, the connection between the bar and the anvil block 107 raises and lowers the latter correspondingly with the blade.

By the mechanism just described it will be seen that in its initial upward movement the upper edge of the blade 105, owing to the position of the fulcrum 104 in relation to the crotch of the adjacent clothespin, bears against the opposing lower edge of the crotch and operates not only to force the pin rearward, but also to press upward and into close gripping relation to the lower edges of the legs the untwisted portions of the wire which span the space between the legs. It will also be seen that as the movement of the blade to a vertical position continues the head of the clothespin is disengaged from the resilient block 103 and driven hard against the abutment 107, with the result that the twisted portion of the wire is clinched firmly and securely against the crotch of the clothespin.

In each succeeding forward stroke of the plunger 34 and rod 204 a clothespin with reenforcing wire applied thereto as hereinbefore described, is discharged endwise from the trough member 29, passing thence upon a belt 123 or other appropriate take-off element.

Preferably a brush wheel 124 rotates in contact with the clothespin and insures its rapid ejectment. This wheel is fast on one end of a shaft 125 which has its bearings in a bracket 126 on the bed, the other end of the shaft being equipped with a sheave 127 which is connected by means of a belt 128 with a sheave 129 fast on the drive shaft. (See Figs. 1, 2 and 3). This application is a continuation in part of an application Serial No. 327,231, filed December 20, 1928, which discloses a machine embodying the mechanisms herein shown and described, excepting the supplemental feed devices for the clothespins, and the means for gradually raising the closed pincers during the twisting operation; said application Serial No. 327,231 being in turn a continuation in part of an application Serial No. 203,878, filed July 7, 1927, which discloses a machine embodying means for successively advancing clothespins, wire feeding means operative to position a measured length of reenforcing wire adjacent the path of each succeeding clothespin, means operative to centralize the slot of the clothespin adjacent the wire, clamp said wire on the clothespin, sever said wire, and bend it about the body of the clothespin, with the ends of the wire extending beyond the slot, means for twisting together and in close relation to the slot the extending ends of the wire, and means for thereafter forcibly bending the twisted ends of the wire into the slot at the crotch of the clothespin.

My invention is not limited to the particular exemplifying embodiment herein disclosed, as the mechanisms may be modified within the principle of the invention and the scope of the appended claims.

I claim—

1. The combination with means for supporting a wooden clothespin, of means for bending reenforcing wire about the body of the clothespin adjacent the crotch thereof and with the free ends of the bent wire extending beyond the space between the legs of the clothespin, means for twisting together and in close relation to said space the extended ends of the wire, and means for bending the twisted ends into the said space and transversely of the clothespin, whereby the untwisted parts of the wire which span the space and merge with the inwardly-bent twisted ends are forced against the opposing lateral corners of the legs of the clothespin.

2. The combination with means for supporting a wooden clothespin, of a pair of complementary members movable into and from embracing relation to the body of the clothespin, and adapted to bend reenforcing wire about the clothespin and with the free ends of the bent wire extending beyond the space between the legs of the clothespin, means for actuating said members, means for twisting together and in close relation to said space the extended ends of the wire, and means for bending the twisted ends into the said space and transversely of the clothespin, whereby the untwisted parts of the wire which span the space and merge with the inwardly-bent twisted ends are forced against the opposing lateral corners of the legs of the clothespin.

3. The combination with means for supporting a wooden clothespin, of means for bending reenforcing wire about the body of the clothespin adjacent the crotch thereof and with the free ends of the bent wire extending beyond the space between the legs of the clothespin, means, including a rotatable gripper, for twisting together and in close relation to said space the extended ends of the wire, and means for bending the twisted ends into the said space and transversely of the clothespin, whereby the untwisted parts of the wire which span the space and merge with the inwardly-bent twisted ends are forced against the opposing lateral corners of the legs of the clothespin.

4. The combination with means for supporting a wooden clothespin, of means for bending reenforcing wire about the body of the clothespin adjacent the crotch thereof and with the free ends of the bent wire extending beyond the space between the legs of the clothespin, means for twisting together and in close relation to said space the extended ends of the wire, and means for first bending the twisted ends longitudinally of the clothespin and then transversely thereof into the space between the legs of the clothespin and against the crotch, whereby the untwisted parts of the wire which span the space and merge with the inwardly-bent twisted ends are forced against the opposing lateral corners of the legs of the clothespin.

5. The combination with means for successively advancing wooden clothespins, of means for positioning reenforcing wire in a location adjacent the path of each succeeding clothespin, means for bending the wire about the adjacent clothespin with the respective ends of the wire extending beyond the slot at one side of the clothespin, means for twisting together and in close relation to the slot the extended ends of the wire, and means for thereafter forcibly bending the thus twisted ends of the wire into the slot at the crotch of the clothespin.

6. The combination with means for successively advancing wooden clothespins, of wire feeding means operative to deliver a predetermined length of reenforcing wire in a location adjacent the path of each succeeding clothespin, means operative to sever the length of wire and to bend it about the body of said clothespin, with the ends of the bent wire extending beyond the slot at one side of the clothespin, means for twisting together and in close relation to the slot the extended ends of said wire, and means for thereafter forcibly bending the twisted ends of the wire into the slot at the crotch of the clothespin.

7. The combination with means for successively advancing wooden clothespins, of wire feeding means operative to deliver a predetermined length of reenforcing wire in a location adjacent the path of each succeeding clothespin, means operative to centralize the slot of the clothespin adjacent the wire, sever the length of wire, and bend it about the body of the clothespin, with the ends of the bent wire extending beyond the slot at one side of the clothespin, means for twisting together and in close relation to the slot the extended ends of said wire, and means for thereafter forcibly bending the twisted ends of the wire into the slot at the crotch of the clothespin.

8. The combination with means for successively advancing wooden clothespins, of wire feeding means operative to deliver a predetermined length of reenforcing wire in a location adjacent the path of each succeeding clothespin, means operative to clamp the length of wire on the clothespin, sever such length of wire, and bend the wire about the body of the clothespin, with the ends of the bent wire extending beyond the slot at one side of the clothespin, means for twisting together and in close relation to the slot the extended ends of said wire, and means for thereafter forcibly bending the twisted ends of the wire into the slot at the crotch of the clothespin.

9. The combination with means for successively advancing wooden clothespins, of wire feeding means operative to deliver a predetermined length of reenforcing wire in a location adjacent the path of each succeeding clothespin, means operative to centralize the slot of the clothespin adjacent the wire, clamp said wire on the clothespin, sever said wire, and bend it about the body of the clothespin, with the ends of the wire extending beyond the slot at one side of the clothespin, means for twisting together and in close relation to the slot the extended ends of said wire, and means for thereafter forcibly bending the twisted ends of the wire into the slot at the crotch of the clothespin.

10. The combination with means for successively advancing clothespins, of means for feeding a predetermined length of wire across the path of each succeeding clothespin, means operative to bend the wire about the body of the adjacent clothespin with the respective ends of the wire extending beyond the clothespin and in close parallel relation, a rotary gripper for thereafter grasping the extremities of the extending ends of the wire and twisting such ends tightly together, and means for thereafter bending the thus twisted ends of the wire into the space between the legs of the clothespin.

11. The combination with means for supporting a wooden clothespin, of means for positioning a length of reenforcing wire rectilinearly across the clothespin adjacent the crotch thereof, a pair of complementary substantially semi-circular jaws movable into and from embracing relation to the body of the clothespin, and means for simultaneously actuating said jaws, said jaws having at their outer ends substantially radial bending surfaces which in the active movement of the jaws engage the wire at points beyond the respective sides of the clothespin and thereby bend the wire around the clothespin with the free ends of the wire extending outward in substantially parallel relation.

12. The combination with means for supporting a wooden clothespin, of means for bending reenforcing wire about the body of the clothespin, comprising a pair of complementary jaws movable into and from embracing relation to the body of the clothespin, two relatively reciprocable members to one of which the adjacent ends of the jaws are pivoted, links pivotally connecting said jaws to the other support, and means for relatively actuating said members.

13. The combination with means for supporting a wooden clothespin, of a reciprocable centralizing member for the clothespin, complementary wire bending jaws movable to and from embracing relation to the body of the clothespin, and means for actuating said centralizing member and wire bending jaws in timed relation.

14. The combination with means for supporting a wooden clothespin, of a reciprocable element having a centralizing member for the clothespin, and having also a wire clamping member, complementary wire bending jaws movable to and from embracing relation to the body of the clothespin, and means for actuating said element and the wire bending jaws in timed relation.

15. The combination with means for supporting a wooden clothespin, of a reciprocable element having a wire clamping portion, complementary wire bending jaws movable to and from embracing relation to the body of the clothespin, and means for actuating said element and the wire bending jaws in timed relation.

16. In means for twisting together the extended ends of a reenforcing metallic ring encircling a bifurcated clothespin, the combination with a supporting element for the clothespin, of a gripper, means for actuating said gripper to cause it to grip the extremities of the extended ends of the reenforcing ring, means for rotating said gripper when it is engaged with the extending ends of the ring, thereby twisting such ends together, and means for effecting relative approachment of the gripper and clothespin to compensate for the varying length of the twisted ends during the twisting operation.

17. In means for twisting together the extended ends of a reenforcing metallic ring encircling a bifurcated clothespin, the combination with a supporting element for the clothespin, of a vertically-movable normally-open gripper, means for actuating said gripper to cause it to grip the extremities of the extending ends of the reenforcing ring, means for rotating said gripper when it is engaged with the ends of the ring, thereby twisting such ends together, and means for gradually moving the closed rotating gripper toward the clothespin to compensate for the varying length of the twisted ends during the twisting operation.

18. In means for twisting together the extended ends of a reenforcing metallic ring encircling a bifurcated clothespin, the combination of a rotary gripper operable to grip and release the extremities of the ends of the reenforcing ring at predetermined intervals, a spindle carrying said gripper and having capacity for limited longitudinal movement, resilient means maintaining said spindle normally retracted with respect to the clothespin, a rotary element having a segmental cam with an inclined acting surface, and gripper operating means, including a reciprocable member, controlled by said cam.

19. In means for twisting together the extended ends of a reenforcing metallic ring encircling a bifurcated clothespin, the combination of a rotary gripper operable to grip and release the extremities of the ends of the reenforcing ring at predetermined intervals, a spindle carrying said gripper and having capacity for limited longitudinal movement, resilient means maintaining said spindle normally retracted with respect to the clothespin, a rotary element having a segmental cam with an inclined acting surface, and having also a segmental friction surface in cooperative relation to said cam, gripper operating means, including a reciprocable member controlled by said cam, and a friction wheel on said spindle in operative relation to the path of the said friction surface.

20. The combination with means for advancing clothespins end to end, of means for bending reenforcing wire about the body of each succeeding clothespin adjacent the crotch thereof, means for twisting together extended ends of the wire, means in the path of the twisted ends operable to bend them toward and longitudinally of the space between the legs of the clothespin during the advancement of the clothespin, and means for thereafter bending such twisted ends transversely of the clothespin and into the space between the legs.

21. The combination with means for advancing clothespins end to end, of means for bending reenforcing wire about the body of each succeeding clothespin adjacent the crotch thereof, means for twisting together extended ends of the wire, means, including an inclined bearing surface, in the path of the twisted ends operable to bend them toward and longitudinally of the space between the legs of the clothespin during the advancement of the clothespin, and means for thereafter bending such twisted ends transversely of the clothespin and into the space between the legs.

22. The combination with means for advancing clothespins end to end, of means for bending reenforcing wire about the body of each succeeding clothespin adjacent the crotch thereof, means for twisting together extended ends of the wire, means in the path of the twisted ends operable to bend them toward and longitudinally of the space between the legs of the clothespin during the advancement of the clothespin, and means for thereafter bending such twisted ends transversely of the clothespin and into the space between the legs, the last named means including an oscillatory member movable against such twisted portion and into the space between the legs.

23. The combination with means for advancing clothespins end to end, of means for bending reenforcing wire about the body of each succeeding clothespin adjacent the crotch thereof, means for twisting together extended ends of the wire, means in the path of the twisted ends operable to bend them toward and longitudinally of the space between the legs of the clothespin during the advancement of the pin, and means for thereafter bending such twisted ends transversely of the clothespin and into the space between the legs, the last-named means including an oscillatory clinching member movable against such twisted ends and into the space between the legs, an abutment member movable into the path of the head of the clothespin, and means for actuating said clinching and abutment members in timed relation.

24. The combination with a supporting element for clothespins, and means for advancing therein clothespins end to end, of means for bending reenforcing wire about the body of each succeeding clothespin adjacent the crotch thereof, means for twisting together extended ends of the wire, means in the path of the twisted ends operable to bend them toward and longitudinally of the space between the legs during advancement of the clothespin, a resilient stop to engage the head of the clothespin, and means for thereafter bending such twisted ends transversely of the clothespin and into the space between the legs, the last-named means including an oscillatory clinching member movable against such twisted ends and into the space between the legs, an abutment member movable into the path of and in spaced relation to the head of the clothespin, and means for actuating said clinching and abutment members in timed relation.

25. In means for bending the twisted ends of a reenforcing metallic ring encircling a bifurcated clothespin, a supporting element, an oscillatory clinching member movable in a plane at right angles to the longitudinal axis of the clothespin and operative to bend the said ends into the space between the legs of the clothespin, and means for holding the clothespin in opposition to the bending action of the oscillatory member.

26. The combination with a supporting element and means for delivering clothespins thereto, of a reciprocative plunger operative against the bifurcated end of each succeeding clothespin delivered to the element and including a blade which extends longitudinally of and is embraced by the legs of the clothespin, and means for bending reenforcing wire about each succeeding clothespin adjacent the crotch thereof when the clothespin is advanced by the plunger, said plunger and bending means being in such timed relation that the bending is effected before the return or idle stroke of the plunger.

27. The combination with a supporting element, and means for delivering clothespins thereto, of a plunger reciprocative longitudinally of said element and operative against the bifurcated end of each succeeding clothespin delivered to the element, the acting end of said plunger having a longitudinally extending blade arranged and adapted to be embraced by the legs of the clothespin.

28. The combination with a supporting element, and a feeder for delivering succeeding clothespins thereto, said feeder having therein a guide adapted to be embraced by the legs of a clothespin, of a plunger reciprocable longitudinally of said supporting element and operative against the bifurcated end of each succeeding clothespin delivered to the element, the acting end of said plunger having a longitudinally extending blade which is arranged and adapted to align with the feeder guide preparatory to the acting stroke of the plunger.

29. The combination with a supporting element to which clothespins are successively delivered, of means reciprocative longitudinally of said supporting element and operative against the bifurcated end of each succeeding clothespin delivered to said element so as to advance the clothespin a suitable distance along the supporting element, and supplemental means for thereafter positively engaging the advanced clothespin and independently moving it farther along the supporting element.

30. The combination with a supporting element to which clothespins are successively delivered, of a plunger reciprocative longitudinally of said supporting element and operative against the bifurcated end of each succeeding clothespin delivered to said element so as to advance the clothespin a suitable distance along the supporting element, a member reciprocative longitudinally of said element concurrently with the plunger, and a dog on said member arranged and adapted to engage the head of each succeeding clothespin when the clothespin has been advanced by the plunger, and thereafter farther advance the clothespin along the supporting element.

Signed at New York, in the county and State of New York, this 2d day of May, A. D. 1929.

JOHN R. NOLAN.